(12) United States Patent
Oggerino et al.

(10) Patent No.: US 7,895,320 B1
(45) Date of Patent: Feb. 22, 2011

(54) METHOD AND SYSTEM TO MONITOR NETWORK CONDITIONS REMOTELY

(75) Inventors: Christopher Paul Oggerino, Reno, NV (US); Joseph Robert Depaolantonio, Gilbert, AZ (US)

(73) Assignee: Cisco Technology, Inc., San Jose, CA (US)

( * ) Notice: Subject to any disclaimer, the term of this patent is extended or adjusted under 35 U.S.C. 154(b) by 91 days.

(21) Appl. No.: 12/061,233

(22) Filed: Apr. 2, 2008

(51) Int. Cl.
*G06F 13/00* (2006.01)
(52) U.S. Cl. .................. 709/224; 709/202; 709/250
(58) Field of Classification Search .......... 709/201, 709/202, 223, 224, 230, 249, 250
See application file for complete search history.

(56) References Cited

U.S. PATENT DOCUMENTS

| | | | | |
|---|---|---|---|---|
| 6,108,782 | A * | 8/2000 | Fletcher et al. | 713/153 |
| 7,392,046 | B2 * | 6/2008 | Leib et al. | 455/423 |
| 7,620,848 | B1 * | 11/2009 | Tanner | 714/25 |
| 2003/0225549 | A1 * | 12/2003 | Shay et al. | 702/182 |
| 2004/0054680 | A1 * | 3/2004 | Kelley et al. | 707/100 |

OTHER PUBLICATIONS

"Centricity Enterprise", *GE Healthcare—Product Features*, [Online]. Retrieved from the Internet: <URL:http://www.gehealthcare.com/usen/hit/products/centricity_enterprise/entrprs_remoteserv.html>, (Apr. 30, 2008), 2 pgs.

Kao, Burgess, et al., "Boeings Global Collaborative Product Development Experience Using MyBoeingFleet.com as an Example", *National Tsing Hua University Industrial Engineering and Engineering Management Deparment.*, [Online]. Retrieved from the Internet: <URL:140.114.53.44/StudentProject/eifinal/Default2003.htm>, (2003), 8 pgs.

Kaseya, "MSP Pioneer Relies on Kaseya for Reliable Remote Access into Customer Environments", *Think Smart Inc.*, [Online]. Retrieved from the Internet: <URL:http://www.kaseya.com/managed-service-providers/success_images/ThinkSmart.CS.kaseya.pdf>, 2 pgs.

\* cited by examiner

*Primary Examiner*—Viet Vu
(74) *Attorney, Agent, or Firm*—Schwegman, Lundberg & Woessner, P.A.

(57) ABSTRACT

In an example embodiment, a system and method are illustrated that include receiving a query requesting a task to be performed by a first network device, the query generated by the first network device. Further, the system and method may include transmitting a first command including the task to be performed by the first network device, the task including an instruction for a second network device.

18 Claims, 13 Drawing Sheets

METHOD AND SYSTEM TO MONITOR NETWORK CONDITIONS REMOTELY

FIELD

This application relates to a system and method for remote monitoring of network conditions.

BACKGROUND

Remote monitoring of network conditions may include a computer system receiving network device updates from the network device itself. These network device updates may include status information with regard to the network device and network traffic processed by this network device. Status information may include the amount of traffic passing across a network, whether the device or other devices within the network are operable, or other suitable information.

BRIEF DESCRIPTION OF DRAWINGS

The presently shown system and method is illustrated by way of example and not limitation in the figures of the accompanying drawings, in which like references indicate similar elements and in which.

DESCRIPTION OF EXAMPLE EMBODIMENTS

Figure 1:
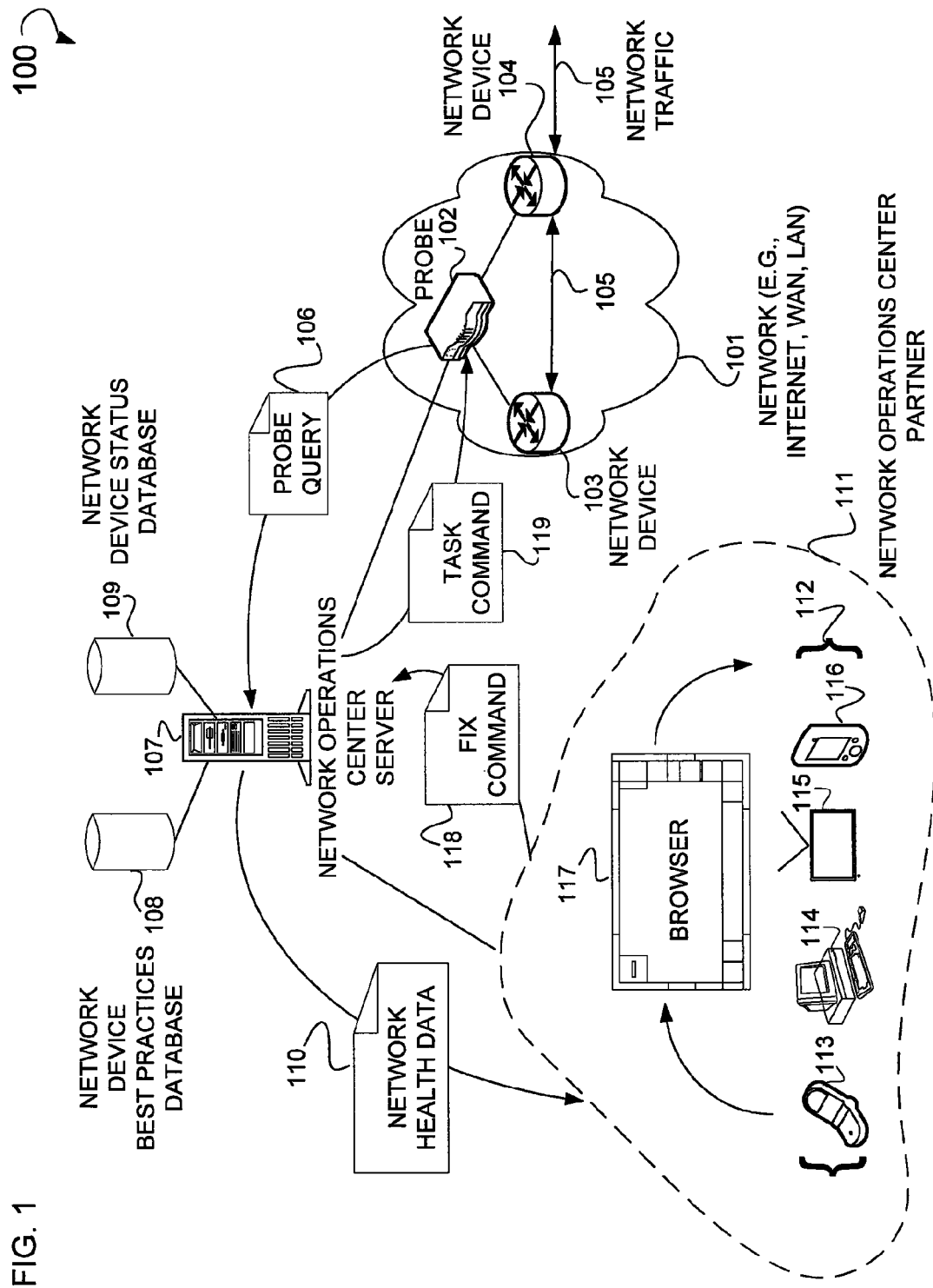
FIG. 1 is a diagram of a system, according to an example embodiment, illustrating the generation of a probe query and a subsequent task command.

In the following description, for purposes of explanation, numerous specific details are set forth in order to provide a thorough understanding of an embodiment of the present invention. It may be evident, however, to one skilled in the art that the present system and method may be practiced without these specific details.

Overview

In an example embodiment, a system and method is illustrated that includes receiving a query requesting a task to be performed by a first network device, the query generated by the first network device. Further, the system and method may include transmitting a first command including the task to be performed by the first network device, the task including an instruction for a second network device.

In some example embodiments, a system and method is illustrated for providing software as a service in a remote network monitoring, diagnosis, and solution environment. This system and method may utilize four or more network devices, each having associated functionality implemented in software, hardware, or firmware. A first network device in the form or a probe may be implemented. Operatively connected to this probe may be a second network device in the form of a router, switch, bridge, or other suitable network device that may be monitored by the first network device. A third network device, in the form of a NOC server may be operatively connected to the first network device. This NOC server may, in turn, be operatively connected to a fourth network device in the form of a network monitoring device such as a network operations center partner.

A network or customer network, as used herein, may be a computer network composed of the first, second, third or fourth devices as nodes and physical or logical links between these nodes. The phrase "operatively connected" may mean the existence of a logical or physical link between nodes. Example networks include the Internet, a Wide Area Network (WAN), a Local Area Network (LAN), or some other suitable network and associated network topology. In some example embodiments, a network device, as used herein, may be a device capable of layer 1, 2, and/or 3 analyses, wherein these layers represent layers within the Transmission Control Protocol/Internet Protocol (TCP/IP) stack model, or the Open Systems Interconnection Basic Reference (OSI) model.

In some example embodiments, the second network device may be owned by one party, managed by another, and monitored by a third party. For example, a Manager Service Provider (MSP) may monitor a network device for a network owner through the use of a NOC server. Other monitoring configurations are also envisioned.

In one example embodiment, the probe may monitor a network, and associated network devices. During the course of monitoring this network, the probe may request to be assigned tasks by the NOC server, and may transmit performance network metrics data back to the NOC server. A task may be a job to be performed by the probe. The NOC server, in turn, may transmit network health data to the monitoring device, wherein this network health data is based, in part, upon the performance network metrics. The monitoring device may display this network health data to assist in the facilitation of action with regard to the network health data. For example, the network health data may reflect that a device (e.g., a router, switch, or bridge) is down, or otherwise inoperable. Using the monitoring device and an interface associated therewith (e.g., a GUI, or Application Programming Interface (API)), a user may be able to fix the inoperable network device through issuing a fix command. A command may be an instruction set for a network device. This fix command may be received by the NOC server, converted into a task command, and transmitted to the probe by the NOC server. In one example embodiment, a network health report may be displayed by the monitoring device. This network health report may reflect the status of network devices (e.g., which network devices are operable or inoperable), whether best practices as recommended by a network device manufacturer are being followed by the network, and other relevant information.

In some example embodiments, a system and method is shown wherein a customer network includes the probe being monitored by the NOC server. This probe may call home to the NOC server at regular, programmable intervals. In some example cases, a manual call home feature may be implemented. When the probe calls home, it may identify itself and ask if the NOC server has any tasks that should be performed by the probe. Examples of tasks that the probe may perform include network discovery and monitoring of network devices or services. This monitoring may include the recording of "data" in the form of network traffic levels, the health of the network, and the performance of the network (e.g., evaluating whether bottlenecks exist) (collectively referred to as performance network metric, or performance metric). In one example embodiment, when asked to perform a task through the issuance of a task command to the probe by the NOC server, the probe may perform the task and then report the data and results back to the NOC server. A third device is the NOC server. In some example cases, this NOC server is managed by a party that is distinct from the party that manages the monitoring device.

Some example embodiments may include a task command that instructs the probe to one or more of the following actions. The probe may be instructed to perform a security assessment of the network that it is servicing. The probe may be instructed to re-configure one or more network devices that it services. Further, the probe may be instructed to upgrade the operating systems of the various network devices that it services. Further, the probe may be instructed to restart a previously inoperable network device that the probe services. Additionally, the probe may be instructed to engage in various types of performance tuning with regard to these network devices. Performance tuning may include allocating or reallocating the memory (e.g., allocating and reallocating memory thresholds, limits, or boundaries) to meet new network traffic needs. Moreover, the probe may receive certain best practices notifiers relating to how a particular network device that the probe services should be implemented. Using this best practices information, the probe may re-configure the network device that it services. The data that may serve as the basis for these instructions may be stored in a network device status database.

In some example embodiments, a monitoring device may be implemented. This monitoring device may be controlled by an MSP. An MSP may be a person (e.g., a naturally or legally created entity) that manages a network for a customer. The management may be facilitated through the use of the monitoring device. This monitoring device may be a computer system with a browser (e.g., a Hyper Text Markup Language (HTML)/eXtensible Markup Language (XML) capable interpreter) application that allows for the display of network health data.

In some example embodiments, the NOC server and monitoring device may communicate over a network such as the Internet. Additionally, the probe and NOC server may also communicate over a network such as the Internet. The communication between the probe, NOC server, and monitoring device may be facilitated through the use of protocol such as a Hyper Text Transfer Protocol (HTTP), or Secure Hyper Text Transfer Protocol (HTTPS), in conjunction with utilizing Secure Sockets Layer (SSL) protection (collectively HTTPS).

FIG. 1 is a diagram of an example system 100, illustrating the generation of a probe query and a subsequent task command. Shown is a network 101. Residing as part of this network 101 is a probe 102, a network device 103 and a network device 104. These network devices 103 and 104 may be a router, bridge, switch, or other suitable network device or appliance. In one example embodiment, this probe 102 may be a computer system having an 800 MHz Central Processing Unit (CPU) with 512 megabyte of Random Access Memory (RAM), 1 gigabyte of static RAM, and may utilize an operating system including LINUX™.

Flowing through the network 101 is network traffic 105. This network traffic 105 may flow into the network 101 and between the network device 103 and network device 104. The metrics of this network traffic 105 may be retrieved as a network performance metric, wherein a metric may include traffic burst amounts, traffic loads over time and other suitable information. The probe 102 may be operatively connected to network device 103 and network device 104. This connection may be in the form of, for example, a logical or physical connection.

In some example embodiments, the probe 102 may generate and transmit a probe query 106. This probe query 106 may be transmitted across a network, such as network 101 to be received by a NOC server 107. This probe query 106 may be transmitted using any one of a number of protocols, including, for example, the HTTPS protocol. Upon receipt by the NOC server 107, the probe query 106 may be analyzed. Connected to the NOC server 107 is the network device best practices database 108, and a network device status database 109. The NOC server 107 may transmit network health data 110 to a network operations center partner 111.

This network operations center partner 111 may utilize any one of a number of monitoring devices 112 in combination with, for example, some type of GUI 117 as implemented by a browser. This network health data 110 may be transmitted using any one of a number of protocols including, for example, HTTPS. Further, these monitoring devices 112 may include, for example, a cell phone 113, a computer system 114, television or monitor 115, a Personal Digital Assistant (PDA) 116, or a smart phone (not shown). The network operations center partner 111 may utilize the monitoring devices 112 in combination with the GUI 117 may generate a fix command 118.

The fix command 118 may be transmitted using any one of a number of protocols, including HTTPS. The fix command 118 may be transmitted across the network, such as network 101, to be received by the NOC server 107. This network operation center server 107 may then issue and transmit a task command 119 to be received by the probe 102. In some example embodiments, the probe query 106 may be a query including a task request that is generated by the probe 102 wherein these tasks relate to tasks that may be performed by the probe 102. The probe query 106 may be a request for instructions. This probe query 106 may be generated on some predetermined periodic basis. This periodic basis may be determined by a system administrator during the configuration of the probe 102 by the system administrator.

The network health data 110 may include data relating to various network devices (e.g., network device 103 and network device 104) wherein the data may relate to network traffic data, configuration data for the various network devices monitored by the probe 102 (e.g., operatively connected to the probe 102), security assessment data, reconfiguration data, operating system upgrade data, prompts as to whether or not to restart a crashed network device as part of the network 101, performance tuning data (e.g., reallocating network device memory to meet new network traffic needs) or data relating to instructions pertaining to best practices for a particular network device.

A fix command 118 may include a command issued by the network operation center partner 111 and, more specifically, one or more monitoring devices 112 operated by this network operations center partner 111. The fix command 118 may instruct the NOC server 107 to instruct the probe 102 as to certain actions to be undertaken by the probe 102. In some example embodiments, the fix command 118 may include instructions generated by a user utilizing the GUI 117 that are implemented by the probe 102. These instruction and resulting actions may include requesting that the probe 102 reconfigure a network device, that the probe 102 download an updated or new operating system (e.g., an updated version of an Internetwork Operating System (JOS)) for a network device, or perform some other type of task with regard to one or more of the network devices that reside within the network 101 that are monitored by the probe 102.

A task command 119 may be a task encoded and formatted according to, for example, some type of protocol including, for example, a Simple Network Management Protocol (SNMP), a protocol based upon a Command Line Interface (CLI), a Netconf protocol, or some other suitable protocol. In some example embodiments, the task command 119 may transmitted using the HTTPS protocols used to provide instructions to the probe 102.

In some example embodiments, the person (e.g., the MSP) utilizing the network operations center partner 111 may enter into a contractual relationship with both a person (e.g., a device manufacturer) utilizing the NOC server 107, and the person (e.g., a network owner) using the network 101. Under the terms of this contractual relationship, the person utilizing the network 101 may pay a monetary amount to the person utilizing the network operations center partner 111 for the services of having the network 101 monitored by the person utilizing the network operations center partner 111. The person utilizing the network operations center partner 111 may, in turn, pay a monetary amount to the person utilizing the NOC server 107 for the service of being able to utilize the probe 102 to monitor the network devices residing as part of the network 101.

Figure 2:
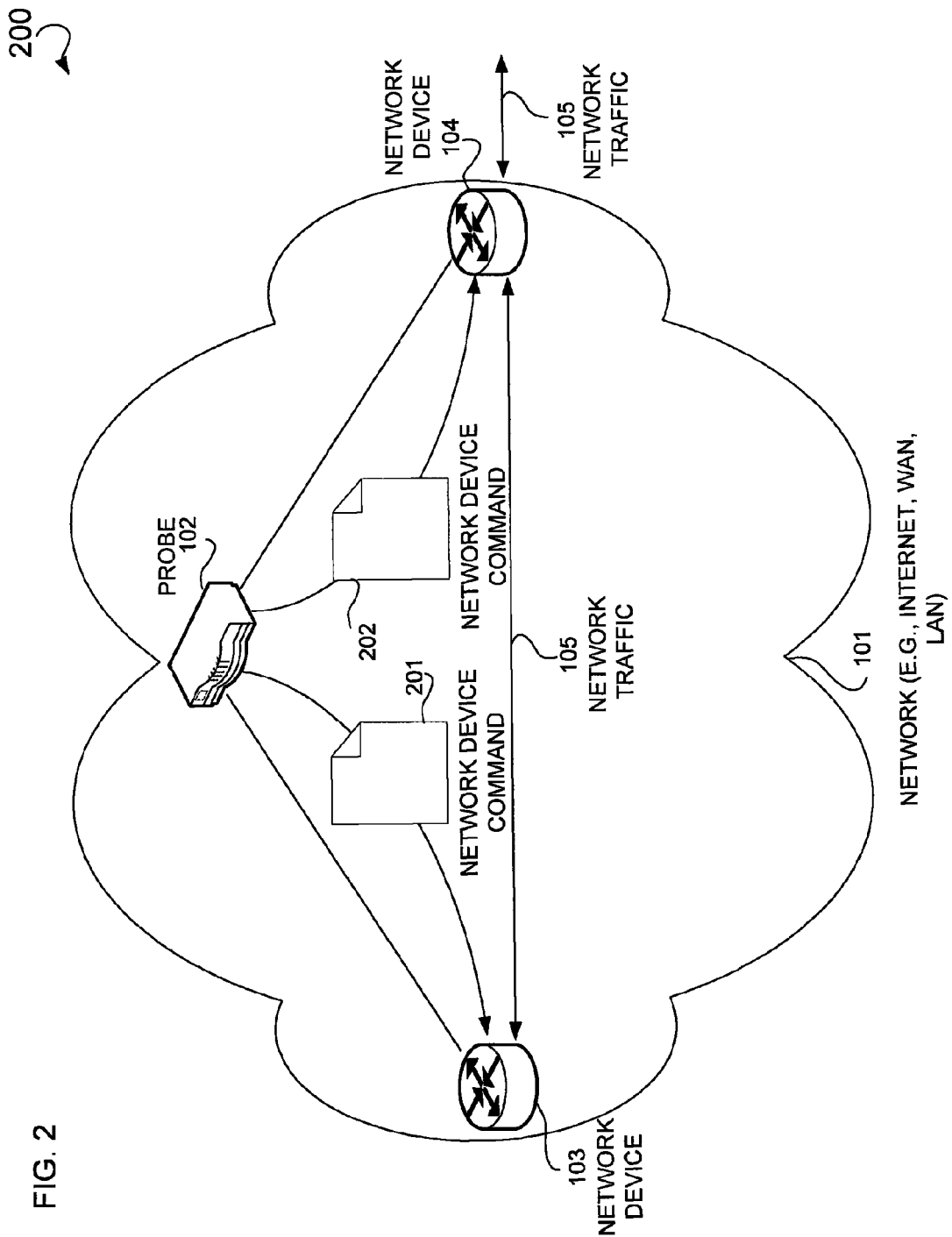
FIG. 2 is a diagram of a system, according to an example embodiment, illustrating the distribution of one or more network device commands.

FIG. 2 is a diagram of an example system 200, illustrating the distribution of one or more network device commands. Shown is a probe 102 that, as previously illustrated, is operatively connected to a network device 103 and network device 104. This probe 102 may transmit a network device command 201 and a network device command 202 to each of the respective network device 103 and network device 104.

These network device commands 201 and 202 may include commands that are formatted using some type of protocol, including, for example, SNMP, CLI, Netconf, or some other suitable protocol to as to instruct a network device 103 and/or network device 104 as to some suitable action that these network devices should undertake. For example, the network device command 201 and network device command 202 may include reconfiguration instructions, or may include instructions to reallocate or to otherwise tune a particular network device. Tuning a network device may include re-allocating, or reconfiguring network device 103, or 104 buffer space. In some example embodiments, other suitable commands may be provided via a network device command 201 and network device command 202.

Figure 3:
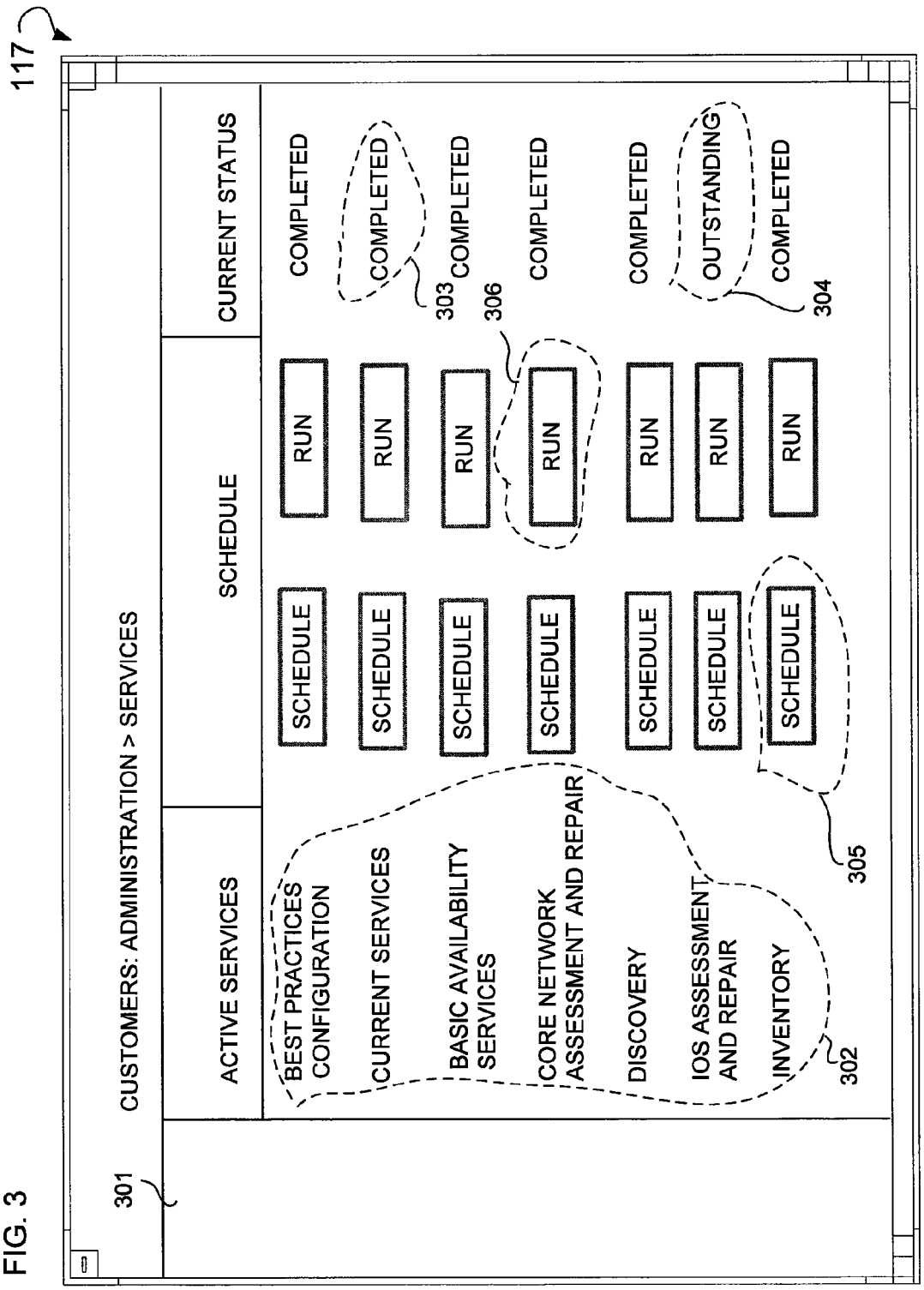
FIG. 3 is a Graphical User Interface (GUI), according to an example embodiment, used to generate a fix command.

FIG. 3 is an example GUI 117 used to generate a fix command 118. Shown is a GUI 117 including a number of screen objects or widgets that when executed generate a fix command 118. A text field 301 may include a functionality hierarchy outlining tasks that may be performed through executing one or more of the screen objects or widgets. Some example tasks are shown within text field 302. These tasks may include generating a fix command 118 to implement a best practices configuration, implement current services, implement basic availability services, implement a core network assessment and repair, implement a network discovery (e.g., to discover network faults), implement IOS assessment and repair, or to implement an inventory (e.g., to take an inventory of network devices). Additionally, these tasks may be thought of as active services available to the persons using the network operations center partner 111. Also shown is a text field 303 denoting the current status of an active service. For example, text field 303 denotes the current status of implementing current services as "completed." A text field 304 denotes the current status of implementing IOS assessment and repair as "outstanding." In example cases where the current status is outstanding, a screen object or widget may be executed to facilitate the implementation of a service. For example, a screen object or widget 305 in the form of a button may be executed to schedule the taking of an inventory of network devices in a network. This schedule may be based upon a future data and time. A screen object or widget 306 in the form of a button is also shown that when executed may implement (e.g., run) a particular service at the instant that the screen object or widget 306 is executed. In example cases where screen objects or widgets 305 or 306 are executed, a fix command 118 may be generated as previously illustrated. The screen objects or widgets 305 or 306 may be executed using some type of input device (e.g., mouse, touch screen, light pen, keyboard) and associated action (e.g., a mouse over action, or mouse click).

In some example embodiments, the GUI 117 may be used to display information relating to network health and/or may be used to display network health reports. This information may include inventory and service status information relating to network devices, network device availability information, network security information, Voice Over IP (VoIP) services information, VoIP-WAN information, and reports generated by the NOC server 107.

Figure 4:
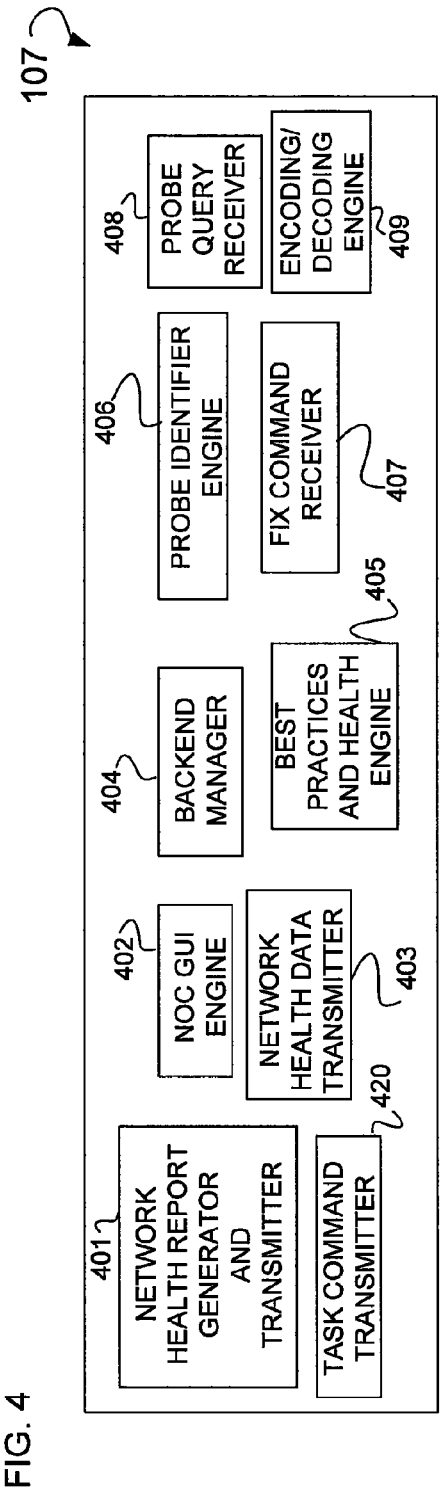
FIG. 4 is a block diagram illustrating a network operations center (NOC) server, according to an example embodiment.

FIG. 4 is an example block diagram illustrating a NOC server 107. The various blocks depicted in FIG. 4 may be implemented as hardware, firmware or software. Illustrated is a network health report generator and transmitter 401 that may generate a network health report. Also shown is a NOC GUI engine 402 that may act to generate a GUI for the NOC server 107. This GUI may be used by, for example, a system administrator or other suitable individual, to configure or otherwise utilize the NOC server 107. Further, this GUI may be used to configure the probe 102.

Also shown is a network health data transmitter 403 that may be used to transmit network health data 110. A backend manager 404 is also illustrated that may be used to manage the network device best practices database 108 and network device status database 109. A best practices and health engine 405 is also shown that may be used to determine whether or not the best practices for a particular network device such as, for example, network device 103 and/or network device 104 are being observed.

A probe identifier engine 406 may also be implemented to uniquely identify a particular probe, such as probe 102. In some example embodiments, this probe identifier engine 406 may utilize, for example, a Globally Unique Identifier (GUID) value that may globally and uniquely identifies the probe 102. A fix command receiver 407 may also be implemented that receives a fix command 118 from, for example, the network operations center partner 111.

A probe query receiver 408 may also be implemented that may receive a probe query 106 from probe 102. An encoding and decoding engine 409 may also be implemented that may encode or decode messages between, for example, the probe 102 and the NOC server 107. This encoding and decoding engine 409 may also be used to encode and decode the transmission of messages between, for example, the monitoring devices 112, and the NOC server 107. Encoding and decoding may utilize any one of a number of protocols including, for example, the HTTPS protocols.

Figure 5:
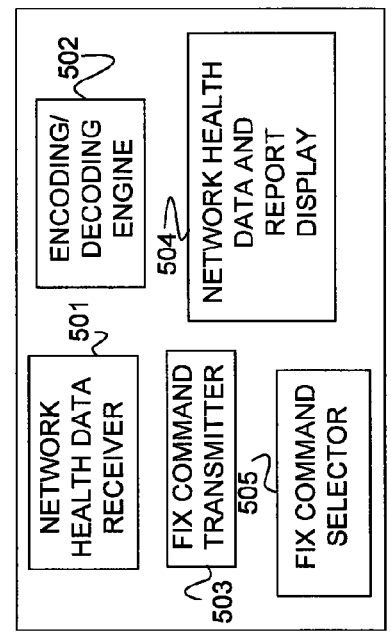
FIG. 5 is a block diagram of a monitoring device, according to an example embodiment, used to generate a fix command.

FIG. 5 is an example block diagram of monitoring devices 112. Illustrated are a number of blocks that maybe implemented in software, hardware or firmware. These blocks may reside as a part of the one or more monitoring device 112. Shown is a network health data receiver 501 that may receive network health data such as network health data 110. An encoding and decoding engine 502 is also shown that may encode or decode the transmission of messages between for example, the monitoring device 112 and the NOC server 107. This encoding or decoding utilized by the encoding and decoding engine 502 may include any one a number of protocols such as the HTTPS protocols. A fix command transmitter 503 is also shown that may transmit a fix command 118. A network health data and report display 504 is also shown that may display network health data 110 and/or a network health report to a user utilizing the GUI 117.

Figure 6:
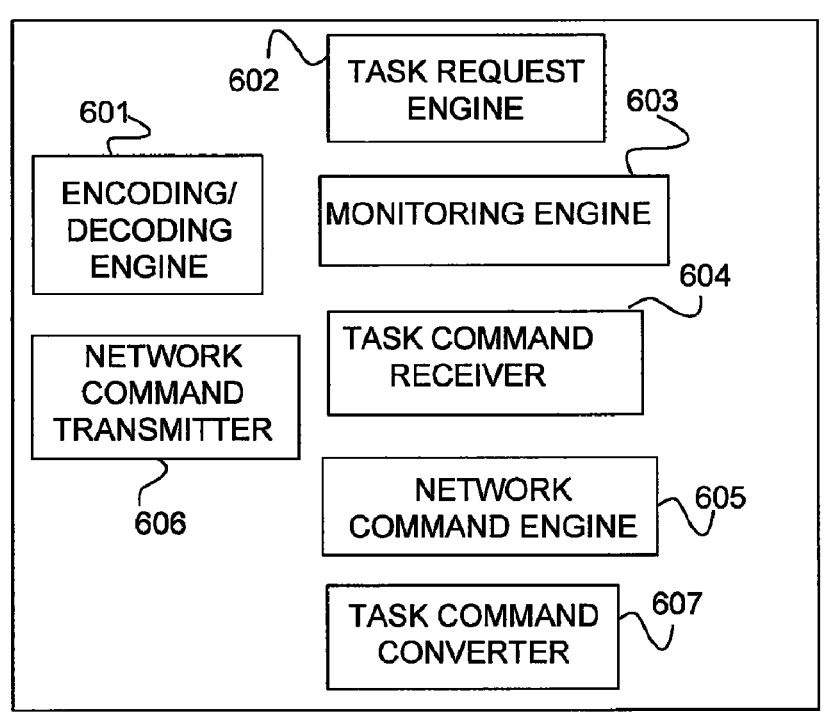
FIG. 6 is a block diagram of a probe, according to an example embodiment.

FIG. 6 is an example block diagram of a probe 102, and the various blocks residing as a part of this probe 102. In some example embodiments, the blocks described herein may be implemented in software, firmware or hardware. These blocks may include an encoding decoding engine 601 that may utilize any one of a number of protocols including for example, the HTTPS protocols.

Further, a task request engine 602 is shown that may generate a task request relating to tasks to be performed by the probe 102. Also shown is a monitoring engine 603 that may monitor network activity such as traffic processed by the network device 103 and/or network device 104. Also shown is a network command engine 605 that may generate network device commands such as network device command 201 and 202.

Further, a network command transmitter 606 is shown that may transmit these network commands generated by the network command engine 605. Additionally, a task command converter 607 is shown that may convert tasks such as task command 119 from one protocol to another protocol. This conversion may convert task encoded in a protocol utilized between the NOC server 107 and probe 102, and convert or transform this protocol to another protocol utilized between the probe 102 and the network devices 103 and network devices 104.

Figure 7:
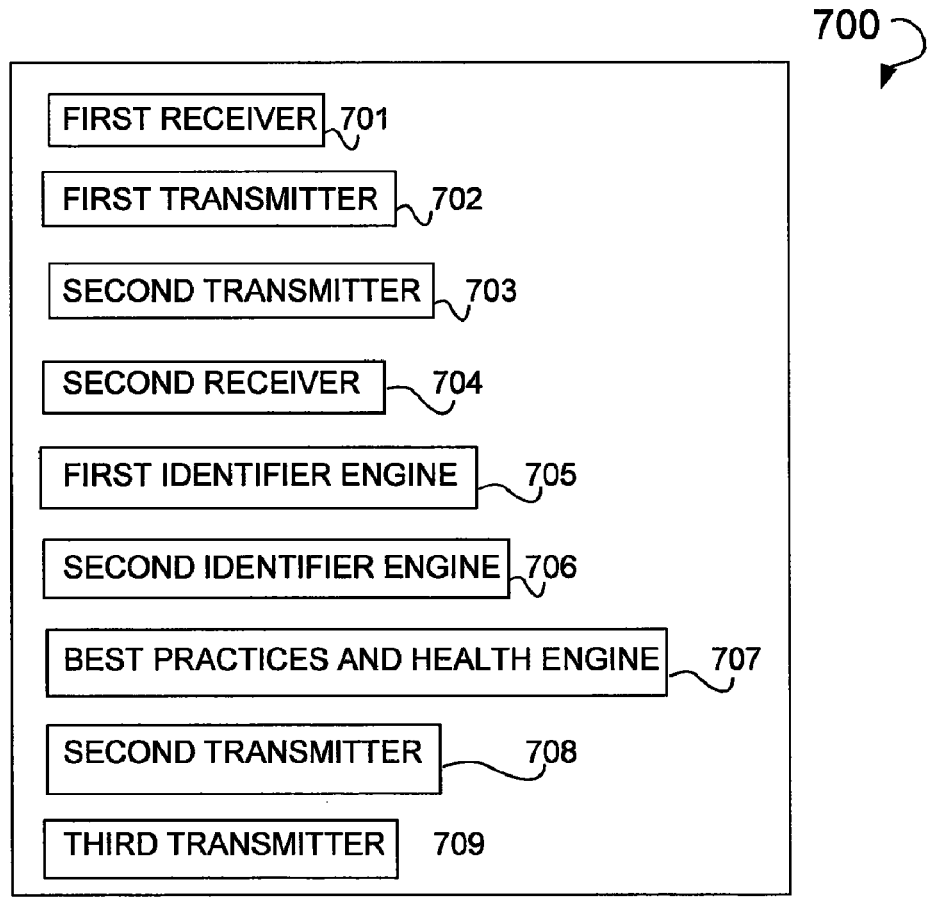
FIG. 7 is a block diagram of a NOC server, according to an example embodiment, that receives queries from a probe.

FIG. 7 is an example block diagram of a NOC server 107. Illustrated are a number of blocks that maybe implemented in software, hardware or firmware. These blocks may reside as a part of the NOC server 107. Shown is a first receiver 701 to receive a query that requests a task to be performed by a first network device, the query generated by the first network device. A first transmitter 702 is also shown to transmit a first command that includes the task to be performed by the first network device, the task including an instruction for a second network device. In some example embodiments, the query is a probe query 106 generated by a probe. Some example embodiments may include the first network device is a probe 102, and the second network device includes at least one of a router, switch, or bridge (e.g., each referenced a network device 103 or network device 104 herein). A second transmitter 703 is also shown to transmit network health data that relates to the second network device. A second receiver 704 is illustrated to receive a second command based upon the network health data that includes instructions for the second network device. In some example embodiments, the network health data may include data relating to a network performance metric for the second network device. Further, the second command may be a fix command 118 generated by a network operations center partner 111, and specifically the monitoring devices 112 residing thereon. A first identifier engine 705 is shown to identify data relating to the second network device. A second identifier engine 706 is illustrated to identify a best practice standard relating to the second network device, the best practice standard developed by a manufacturer of the second network device. A best practices standard may include, for example, recommended traffic load settings, memory usage settings, network device configuration settings, buffer settings, or some other suitable recommended practice. A best practice standard may be recommended by a network device manufacturer, a system administrator, or other suitable person.

In some example embodiments, the NOC server 107 includes a best practices and health engine 707 to determine if the best practice standard is being followed by the second network device based upon an intersection of the best practice standard and the data. This best practices and health engine 707 may be similar to the best practices and health engine 405. A second transmitter 708 is also shown that transmits network health data that includes the best practice standard, wherein the data and the best practices standard do not intersect. In some example embodiments, the network health data 110 includes at least one of: security assessment data relating to the second network device, operating system data relating to the second network device, configuration data relating to the second network device, best practices data relating to the second network device, network traffic data encountered by the second network device, memory threshold data for the second network device, service record data for the second network device, performance tuning data relating to the second network device, and operability data for the second network device. A third transmitter 709 is illustrated that transmits a network health report that includes the network health data.

Figure 8:
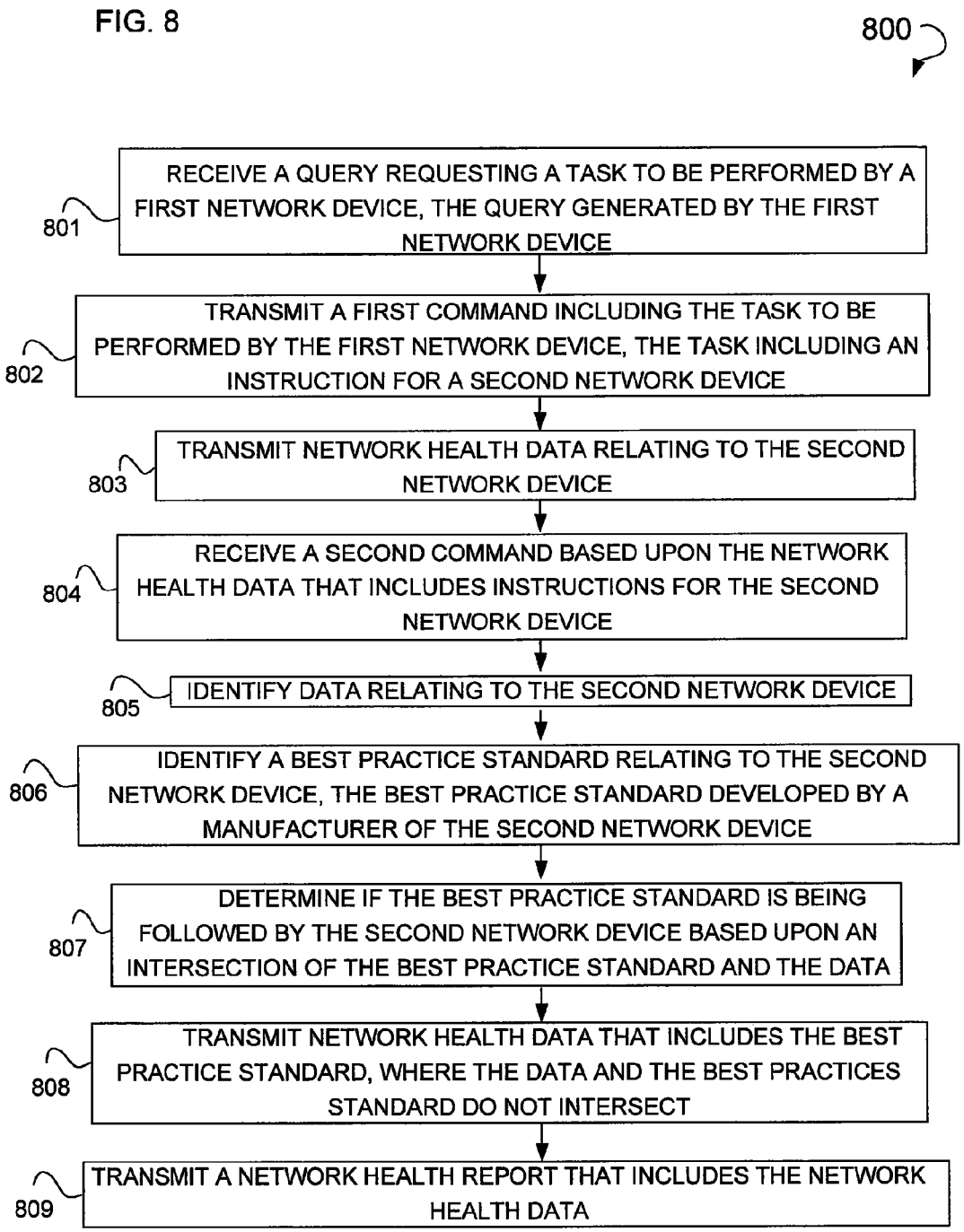
FIG. 8 is a flow chart illustrating a method, according to an example embodiment, for transmitting network health data.

FIG. 8 is a flow chart illustrating an example method 800 for generating a task command. Illustrated are various operations 801-809 that are executed by the NOC server 107. Shown is an operation 801 that, when executed, receives a query requesting a task to be performed by a first network device, the query generated by the first network device. An operation 802 is also executed that transmits a first command including the task to be performed by the first network device, the task including an instruction for a second network device. In some example embodiments, the query is a probe query 106 generated by a probe 102. Additionally, in some example embodiments, the first network device is a probe 102, and the second network device includes at least one of a router, switch, or bridge (e.g., each referenced as network device 103 or network device 104 herein). Operation 803 may be executed to transmit network health data relating to the second network device. Operation 804 may be executed to receive a second command based upon the network health data that includes instructions for the second network device. In some example embodiments, the network health data includes data relating to a network performance metric for the second network device. Further, the second command may be a fix command generated by a network operations center partner 111, and monitoring devices 112 residing thereon.

In some example embodiments, an operation 805 may be executed by the NOC server 107 to identify data relating to the second network device. Operation 806, when executed, may identify a best practice standard relating to the second network device, the best practice standard developed by a manufacturer of the second network device. Operation 807, when executed, may determine if the best practice standard is being followed by the second network device based upon an intersection of the best practice standard and the data. Operation 808, when executed, may transmit network health data that includes the best practice standard, wherein the data and the best practices standard do not intersect. In some example embodiments, the network health data 110 includes at least one of security assessment data relating to the second network device, operating system data relating to the second network device, configuration data relating to the second network device, best practices data relating to the second network device, network traffic data encountered by the second network device, memory threshold data for the second network device, a service record data for the second network device, performance tuning data relating to the second network device, and operability data for the second network device. Operation 809, when executed, includes transmitting a network health report that includes the network health data.

Figure 9:
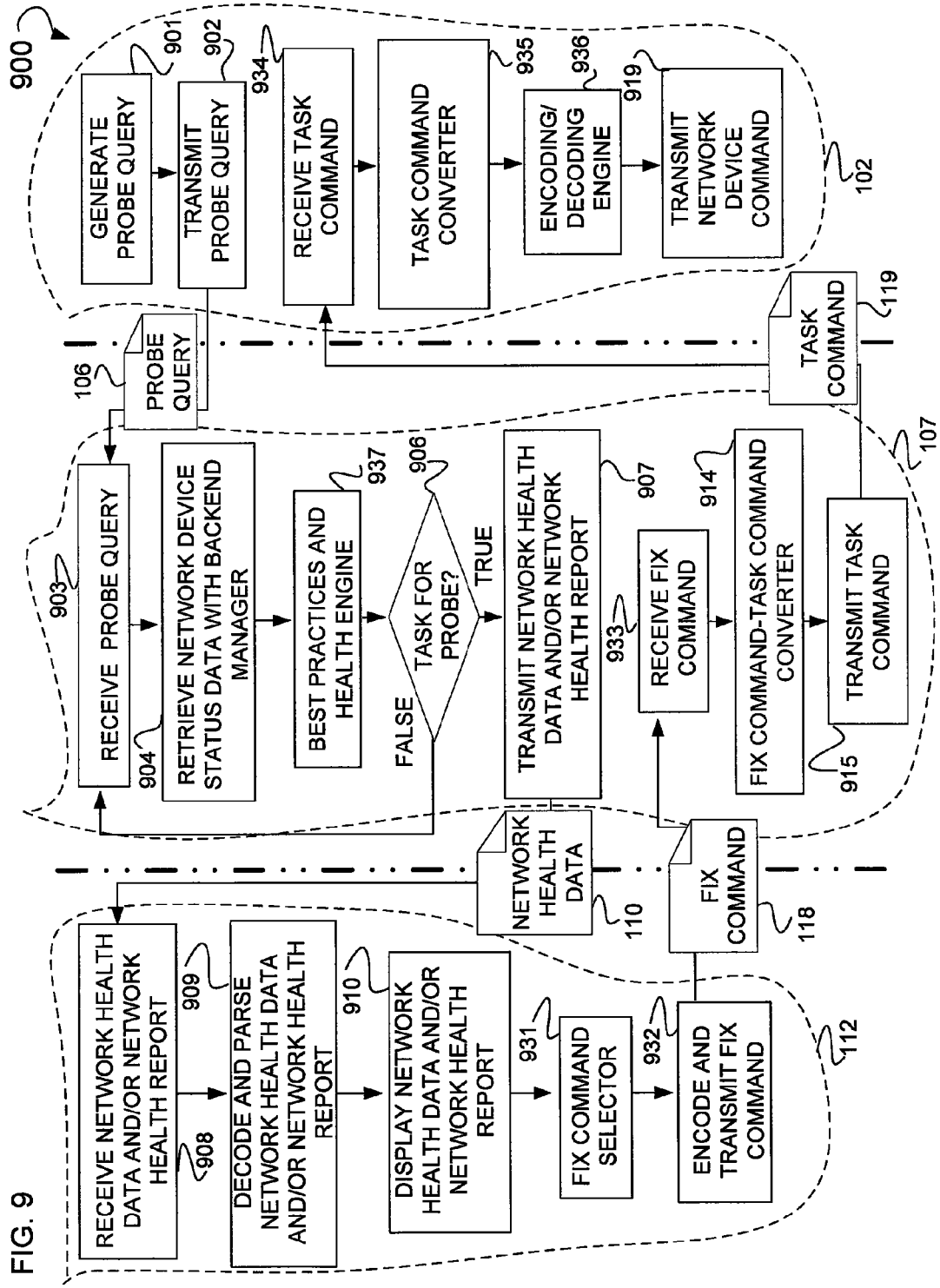
FIG. 9 is a flow chart illustrating a method, according to an example embodiment, used to generate and process a task command.

FIG. 9 is a flow chart, illustrating an example method used to generate and process a task command. Shown are a number of operations that reside as a part of the probe 102. These operations include operations 901-902, 934-936 and 919. Also shown are a number of operations that are executed by, for example, the NOC server 107. These operations include operations 903-904, 937, 906-907, 933, and 914-915. Also shown are a number of operations that are executed by, for example, the one or more monitoring devices 112. These operations include, for example, operations 908-910, and 931-932.

With regard to those operations executed by the probe 102, an operation 901 may be executed that generates a probe query 106. An operation 902 may be executed that transmits this probe query 106 to be received by the NOC server 107. An operation 903 may be executed to receive this probe query 106.

Further, an operation 904 may be executed that may retrieve network status device data using, for example, a backend manager. This backend manager may be the previously illustrated backend manager 404. An operation 937 may be executed that may implement many of the functionalities described regarding the best practices and health engine. These best practices include, for example, best practices recommended by a particular manufacturer of the network device 103 and/or network device 104. These best practices may pertain to certain types of configuration settings, software to be utilized by a network device, or other information relating to best practices for a network device.

A decisional operation 906 is also shown that determines whether or not a task exists for a particular probe such as probe 102. In cases where decisional operation 906 evaluates to "false," operation 903 is re-executed. In cases where decisional operation 906 evaluates to "true," an operation 907 is executed. Operation 907, when executed, may transmit network health data and/or a network health report to the one or more monitoring devices 112. For example, network health data 110 may be transmitted from the NOC server 107 to be received by the one or more monitoring devices 112.

An operation 908 may be executed that may receive network health data and/or network health report. Additionally, an operation 909 may be executed that may decode and parse this network health data and/or network health report. An operation 910 may be executed that may display this network health data and/or network health report to a user or other individual associated with the network operations center partner 111. This user may utilize the GUI 117 that may reside as a part of the any one of a number of monitoring devices 112 to review the network health data 110. An operation 931 may be executed that may act as the previously illustrated fix command selector. This operation 931 may detect a mouse-click operation, a mouse-over operation, a focus-operation, or some other suitable operation.

An operation 932 may be executed that may encode and transmit the fix command 118. The fix command 118 may be received through the execution of operation 933. An operation 914 may be executed that may act as fix command-task command converter. This fix command-task command converter may translate or otherwise transform a fix command to a task command convert from one set of protocols utilized between the one or more monitoring devices 112 and the NOC server 107, and another set of protocols utilized by the NOC server 107 and the probe 102.

An operation 915 may be executed that may transmit the task command 119. This task command 119 may be received through the execution of operation 934 that may act to receive a task command. An operation 935 may be executed that may act as a task command converter. This task command converter may implement many of the functionalities described as residing as a part of operation 914. Further, this operation 935 may only be executed where, for example, the operation 914 is not implemented as a part of NOC server 107.

In certain cases, the operation 935 may be implemented even in cases where the operation 914 is implemented. An encoding/decoding engine 936 may also be implemented to encode or decode the transmission of a network device command 201 or 202 between the probe 102 and a network device 103 or network device 104. An operation 919 may also be executed to transmit a network device command, such as network device command 201 or network device command 202.

Figure 10:
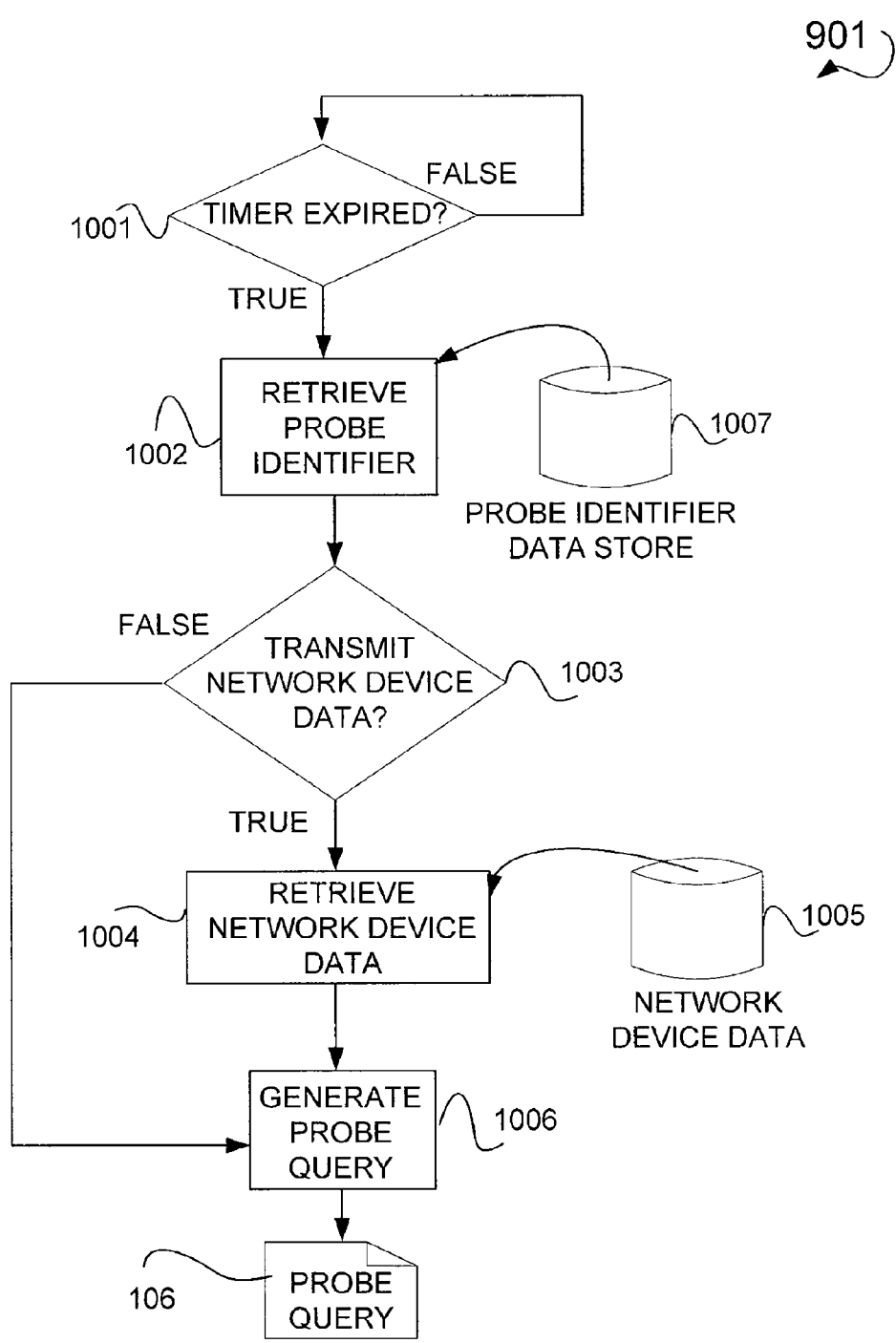
FIG. 10 is a flow chart illustrating the execution of an operation, according to an example embodiment, that generates a probe query.

FIG. 10 is a flow chart illustrating an example operation 901. Shown is a decisional operation 1001 that determines whether or not a timer has expired. This timer may set the period after which a probe query 106 may be generated and transmitted by the probe 102 to be received by the NOC server 107. In cases where a decisional operation 1001 evaluates to "false," an iterative loop or recursive movement or operation is executed such that a decisional operation 1001 is re-executed.

In cases where decisional operation 1001 evaluates to "true," an operation 1002 is executed. This operation 1002 may retrieve a probe identity from a probe identity data store 1007. As previously illustrated, this probe identifier may be a GUID value. A decisional operation 1003 may be executed that may determine whether to transmit network device data. In cases where a decisional operation 1003 evaluates to "false," an operation 1006 may be executed.

In cases where a decisional operation 1003 evaluates to "true," an operation 1004 may be executed. This operation 1004 may retrieve network device data from a network device database 1005. Operation 1006, when executed, may generate a probe query 106. This probe query 106 may then be encoded and transmitted through the execution of operation 902 (see e.g., FIG. 9).

Figure 11:
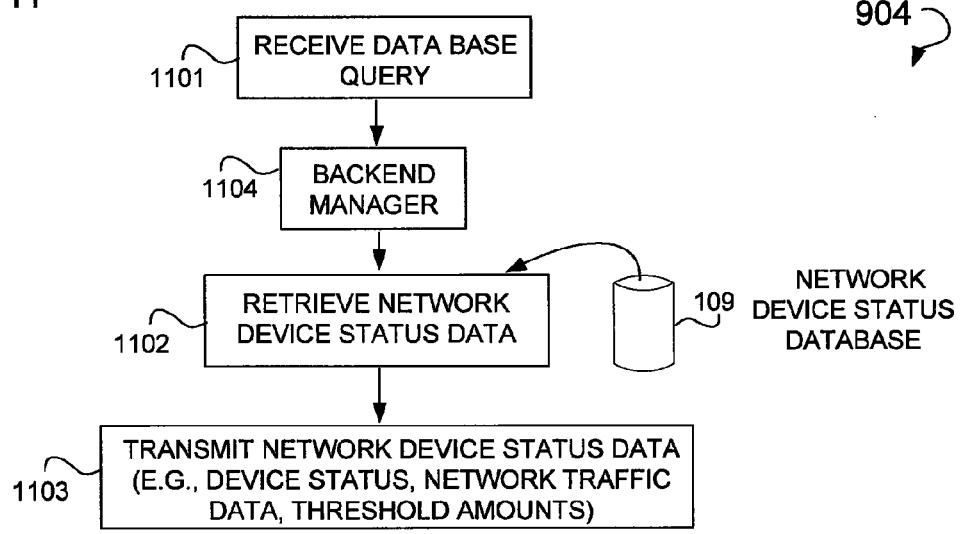
FIG. 11 is a flow chart illustrating an operation, according to an example embodiment, that may be executed to retrieve network status device data.

FIG. 11 is a flow chart illustrating an example execution of operation 904. Shown is an operation 1101 that may receive a database query. An operation 1104 may then be executed to generate a database query encoded in appropriate query language such as, for example, a Structured Query Language (SQL) or some other similar query language. The previously illustrated backend manager 404 may perform this same functionality. In certain example embodiments, the operation 1105 when executed, may manage a plurality of databases. An operation 1102 may be executed that may retrieve network device data status from the network device status database 109. An operation 1103 may be executed that transmits network device status data. This network device status data may relate to device data status, network traffic data status, a threshold network traffic amount status, or some other suitable status information regarding a particular network device (e.g., 103 or 104).

Figure 12:
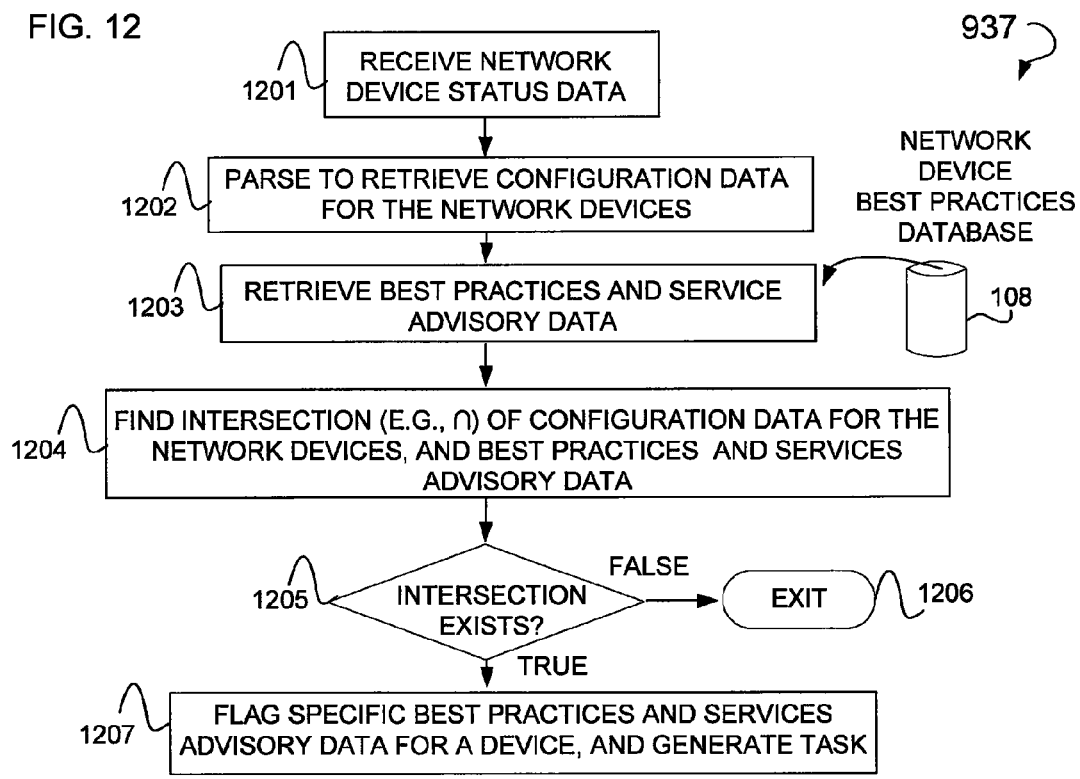
FIG. 12 is a flow chart illustrating the execution of an operation, according to an example embodiment, that may be used to determine whether the best practices for a particular network device are being observed.

FIG. 12 is a flow chart, illustrating the execution of operation 937, wherein this operation 937 may be the previously illustrated best practices and health engine 405. Shown is an operation 1201 that may receive network device status data. An operation 1202 may be executed that may parse this network device status data to retrieve configuration data for a particular network device such as network device 103 and 104. An operation 1203 may be executed that may retrieve best practices and service advisory data from, for example, a network device best practices database 108. An operation 1204 may be executed that finds the intersection (e.g., ∩) of the configuration data for a network device and the best practices and services advisory data. This intersection may allow for a determination as to which network devices, and their associated configuration data, need to be modified and based upon existing or predefined best practices and/or service advisory information. This predefined best practices and/or service advisory information may be authored by a manufacturer of network devices.

A decisional operation 1205 may be executed that may determine whether or not an intersection exists. Cases where a decisional operation 1205 evaluates to "false," a termination or exit condition 1206 is executed. Cases where a decisional operation 1205 evaluates to "true," an operation 1207 is executed. This operation 1207 may flag (e.g., assign a Boolean value) to certain best practices and services advisory data for a particular device. Based upon the flagging, a task is generated to be performed by the probe based upon this best practices and/or service advisory data. This task may include reconfiguring the network device 103 and network device 104 based upon the best practices and service advisory data.

Figure 13:
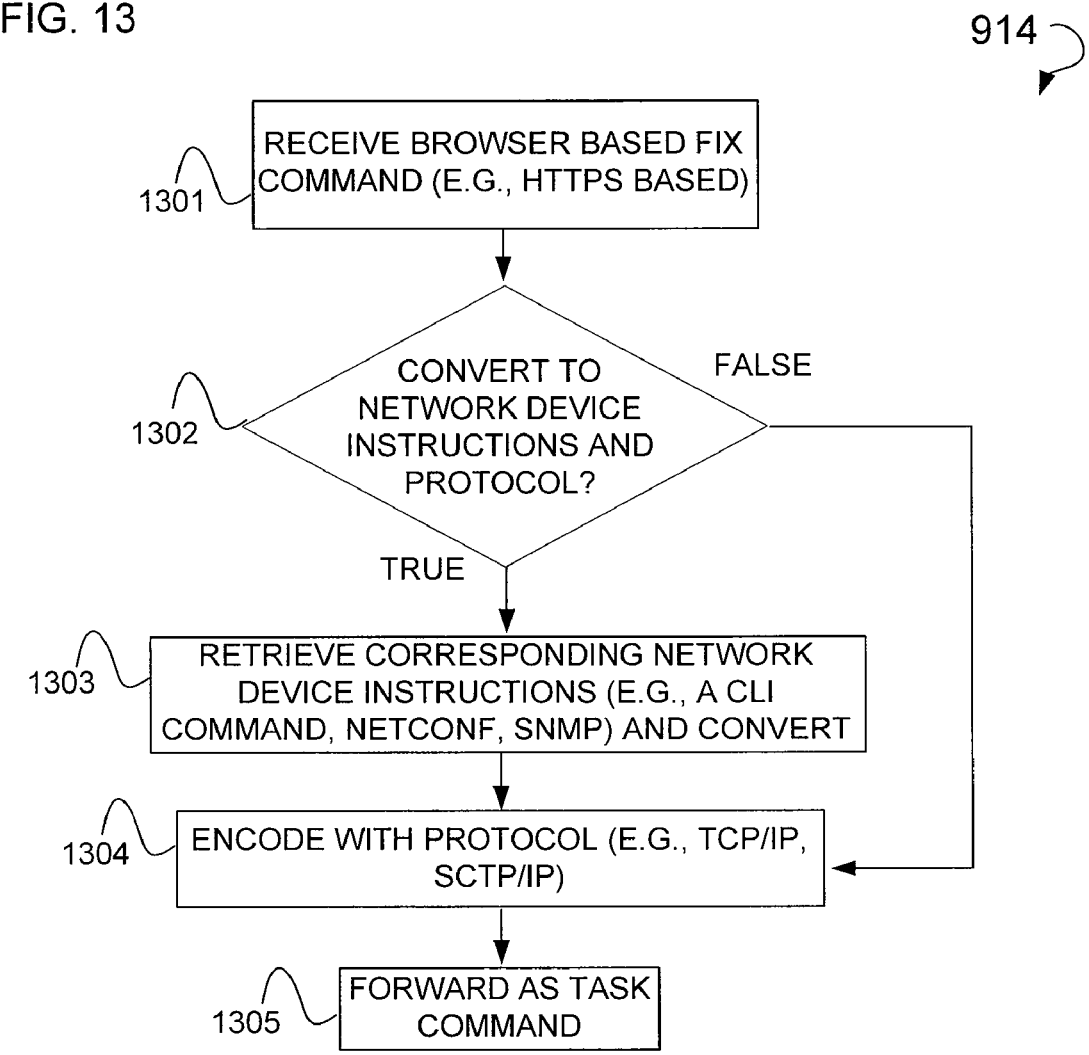
FIG. 13 is a flow chart illustrating the execution of an operation, according to an example embodiment, that may convert a fix command to a task command.

FIG. 13 is a flow chart illustrating the execution of an example operation 914. Shown is an operation 1301 that may receive a fix command 118. A decisional operation 1302 may then be executed that determines whether or not to convert to the network device instructions and protocol when this conversion may be a transformation from one protocol to another. In cases where a decisional operation 1302 evaluates to "false," an operation 1304 is executed. Cases where a decisional operation 1302 evaluates to "true," an operation 1303 may be executed. Operation 1303, when executed, may retrieve a corresponding network device instruction, wherein this network device instruction corresponds to the provided browser-based fix command. For example, if the browser-based fix command is written in a first protocol such as SNMP, this browser-based fix command may be converted to some suitable second protocol utilized by the network device 103 or 104. This second protocol may include, for example, a CLI command or a Netconf command. An operation 1304 may be executed, and it may encode this converted protocol (e.g., CLI command, Netconf command, and/or SNMP command) with some other protocol such as User Datagram Protocol/Internet Protocol (UDP/IP), Transmission Control Protocol (TCP)/IP, or Stream Control Transmission Protocol (SCTP)/IP. An operation 1305 may be executed that may forward this newly converted and encoded information as a task command 119 to, for example, the probe 102.

Figure 14:
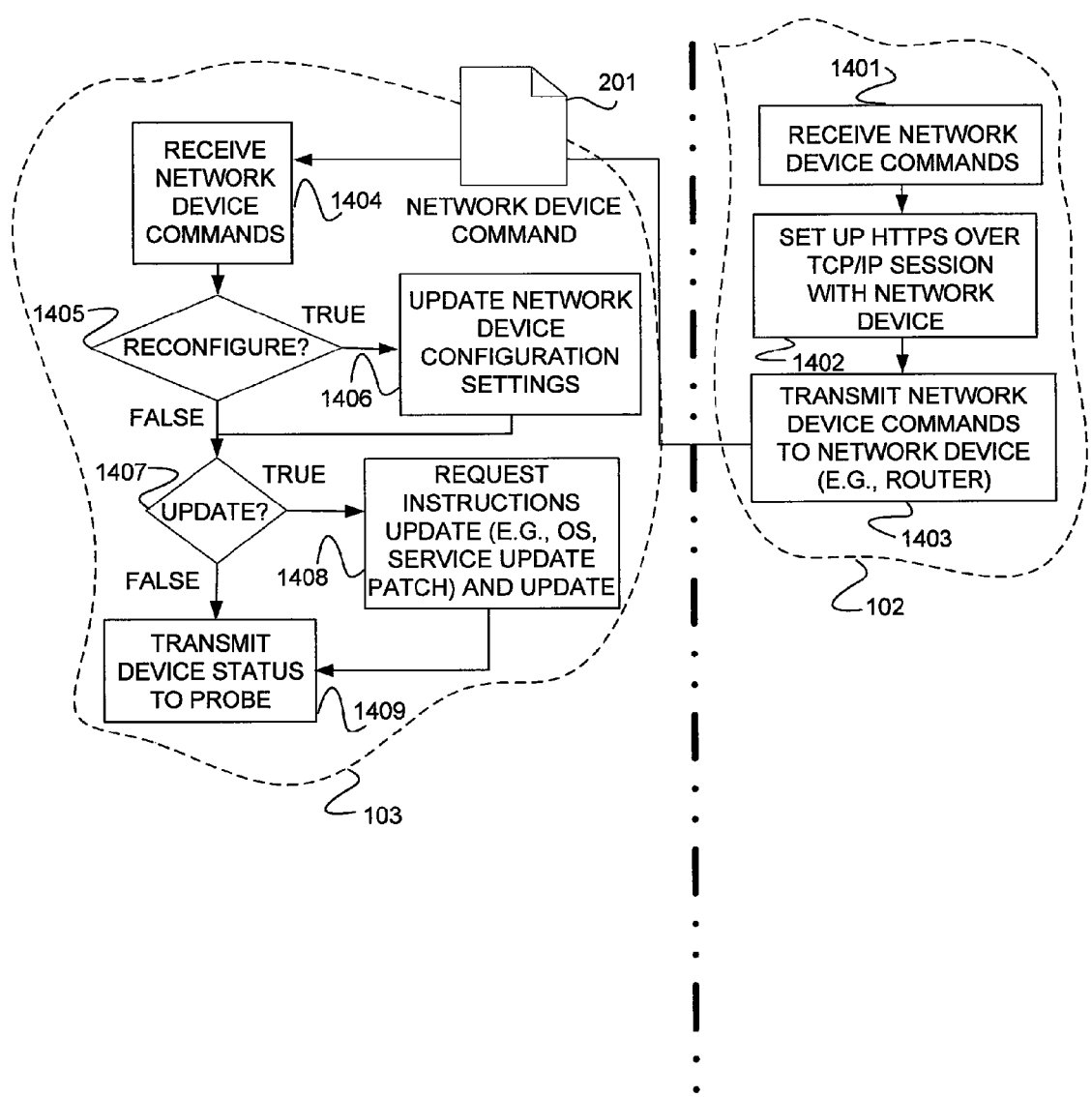
FIG. 14 is a dual-stream flow chart illustrating the execution of an operation, according to an example embodiment, to transmit a network device command.

FIG. 14 is a duel-stream flow chart illustrating the execution of operation 919. Shown are operations 1401 through 1403 that may reside as a part of the probe 102. Also shown are operations 1404 through 1409 that may reside as a part of the network device 103. In some example embodiments, operation 1401, when executed, may receive a network device command. This network device command may be a network device command 201 or 202 that may be received from the probe 102. An operation 1402 may be executed that may set up an HTTPS over TCP/IP, UDP/IP, SCTP/IP session with a particular network device 103 or 104.

An operation 1403 may be executed that may transmit a network device command to a network device where this network device may be, for example, the network devices 103 or 104. A network device command 201 may be transmitted through the execution of operation 1403, wherein this network device command 201 may be received through the execution of operation 1404. Decisional operation 1405 may be executed that may determine whether or not a network device is to be reconfigured. Cases where decisional operation 1405 evaluates to "true," an operation 1406 may be executed that may update a network device, which is network device 103 or 104 with new or additional configuration settings or instructions.

Cases were decisional operation 1405 evaluates to "false," a decisional operation 1407 may be executed that determines whether or not a network device is to be provided with updates. These updates may include, for example, software updates, operating system updates or other some other suitable type of update. Cases where a decisional operation 1407 evaluates to "true," an operation 1408 may be executed where this operation 1408 when executed may request an instruction update from, for example, the probe 102 and/or the NOC server 107.

In cases where decisional operation 1407 evaluates to "false," an operation 1409 may be executed that may transmit a device status and information to the probe 102. The types of device status and information sent to the probe 102 may include a security assessment information, operating system versioning information, re-start requirements for a network device, configuration or network performance metrics (e.g., information) for a network device, or information regarding whether best practices have been observed.

Figure 15:
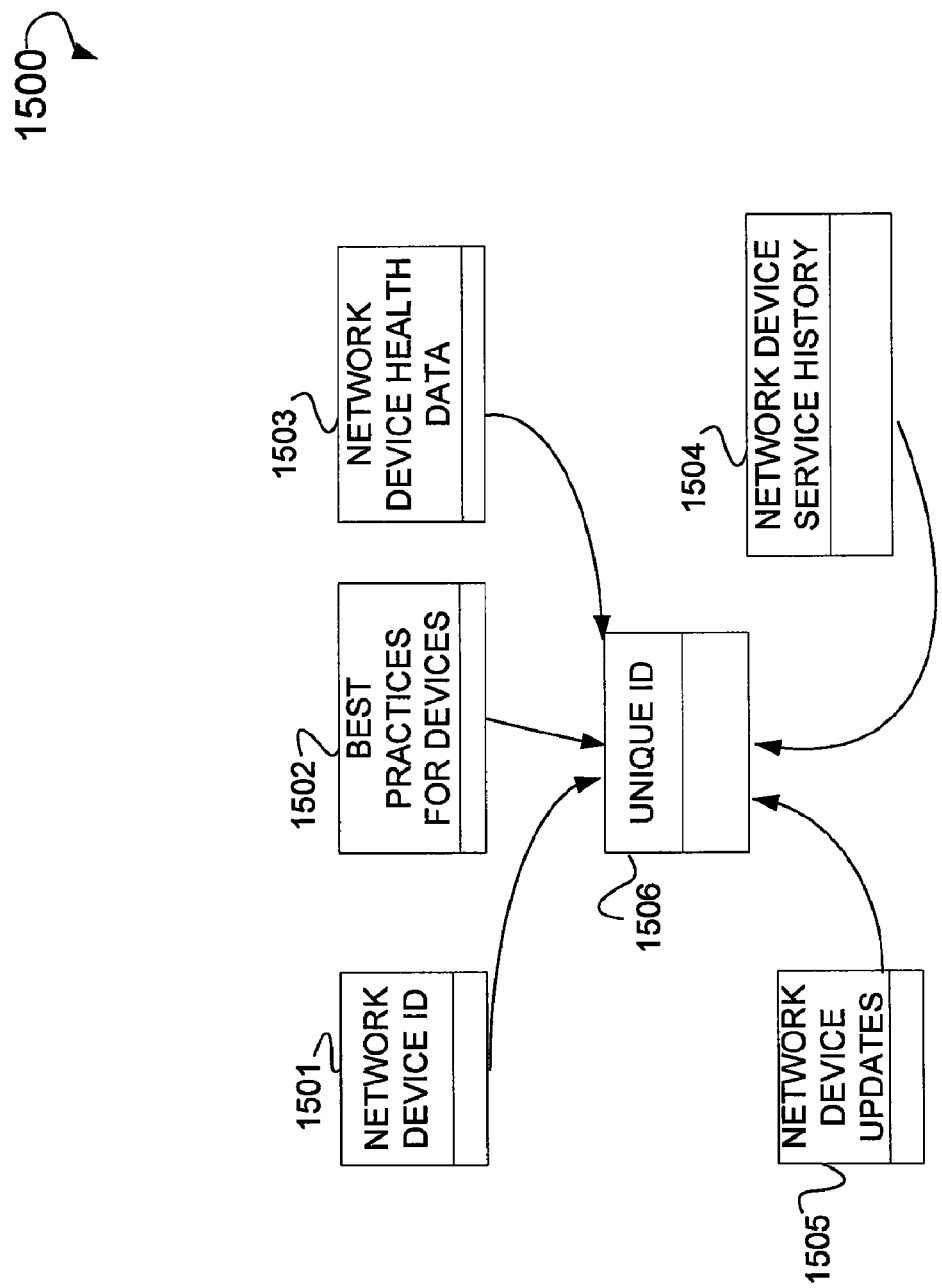
FIG. 15 is a Relational Data Scheme (RDS), according to an example embodiment, illustrating various data tables.

FIG. 15 is a RDS 1500 illustrating various data tables to be used in some embodiments of the system and method illustrated herein. Shown is a table 1501 including a network device I.D. This network device I.D. may be a GUID, wherein this GUID may be an integer, float or double data type.

A table 1502 is also shown, including best practices for a device. In some example embodiments the best practices may be, for example, data relating to certain types of configurations for particular types of network devices where these configurations are settings that are stored as an XML data type into the table 1502. Further, each entry into this table 1502 may be uniquely identified via an integer data type that may serve as a key value.

A table 1503 is also shown that includes network device health data. This network device health data may include XML or other suitably formatted data that may illustrate the health of a particular network. This health may be understood in terms of network traffic uptime for particular devices that are part of the network (e.g., network device 103 and 104), or other suitable network device health data.

Also shown is a table 1504 that includes network device service history. This network device service history data may include data stored as an XML data type that includes information relating to the service history for particular network devices. These network devices may be part of the network 101. A table 1505 is also shown that includes network device updates. Stored in this table 1505 may be information in the form of XML-formatted data stored according to an XML data type. That includes network device updates for a particular device such as network devices 103 and 104 that may be part of a network 101. Also shown is a table 1506 that includes one or more unique identifier values for the various tables 1501 through 1505. These unique identifiers may serve to uniquely identify each entry (e.g., tuple) in the previously illustrated tables.

Figure 16:
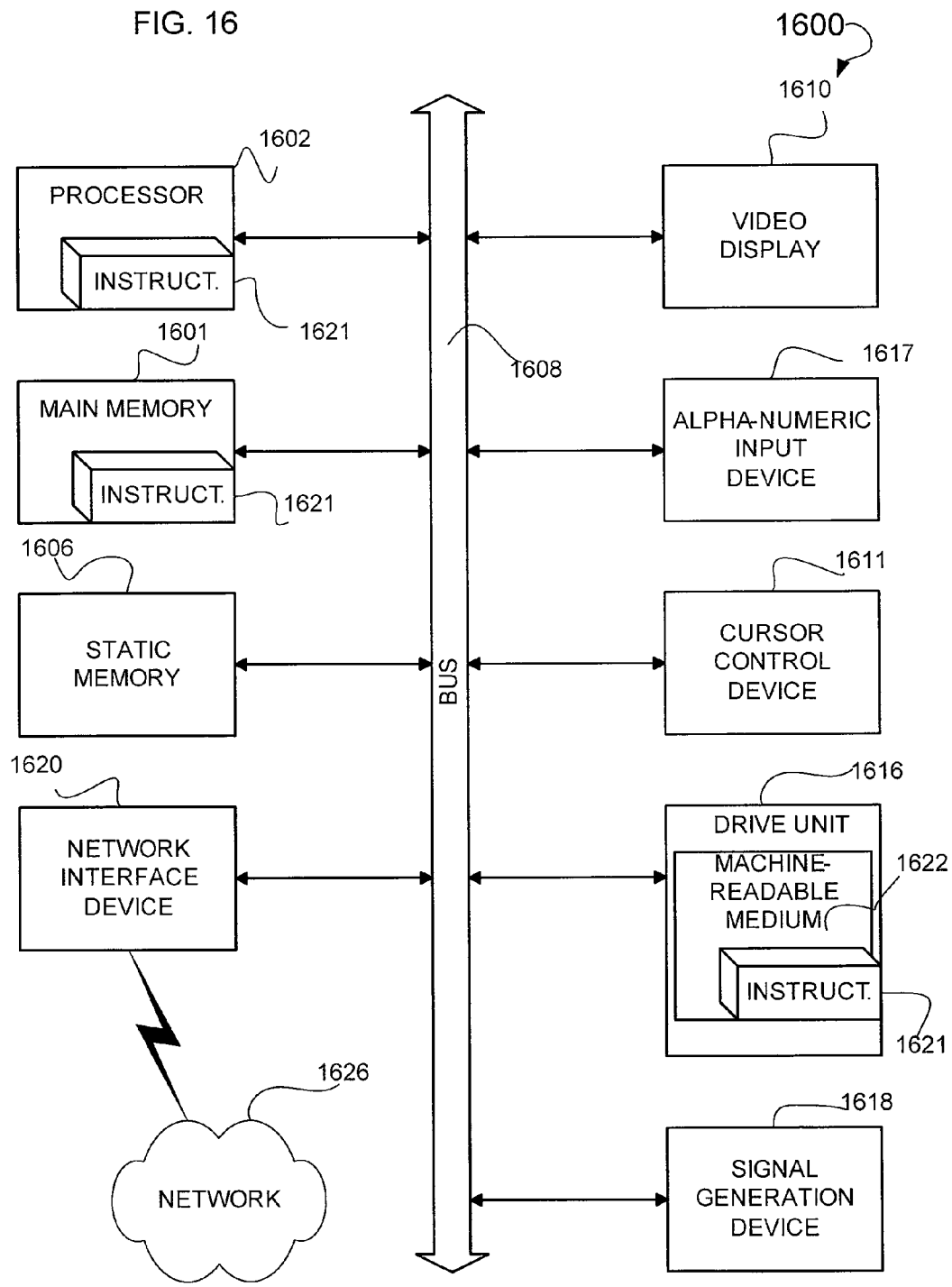
FIG. 16 shows a diagrammatic representation of a machine, according to an example embodiment, in the form of a computer system.

FIG. 16 shows a diagrammatic representation of a machine in the example form of a computer system 1600 within which a set of instructions for causing the machine to perform any one or more of the methodologies discussed herein may be executed. In alternative example embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a PC, a web appliance, a network router, switch, or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1600 includes a processor 1602 (e.g., a CPU, a Graphics Processing Unit (GPU) or both), a main memory 1601, and a static memory 1606, which communicate with each other via a bus 1608. The computer system 1600 may further include a video display unit 1610 (e.g., a Liquid Crystal Display (LCD) or a Cathod Ray Tube (CRT)). The computer system 1600 also includes an alphanumeric input device 1617 (e.g., a keyboard), a User Interface (UI) cursor control device 1611 (e.g., a mouse), a disk drive unit 1616, a signal generation device 1618 (e.g., a speaker) and a network interface device (e.g., a transmitter) 1620.

The disk drive unit 1616 includes a machine-readable medium 1622 on which is stored one or more sets of instructions and data structures (e.g., software) 1621 embodying or utilized by any one or more of the methodologies or functions illustrated herein. The software may also reside, completely or at least partially, within the main memory 1601 and/or within the processor 1602 during execution thereof by the computer system 1600, with the main memory 1601 and the processor 1602 also constituting machine-readable media.

The instructions 1621 may further be transmitted or received over a network 1626 via the network interface device 1620 using any one of a number of well-known transfer protocols (e.g., HTTP, or HTTPS).

While the machine-readable medium 1622 is shown in an example embodiment to be a single medium, the term "machine-readable medium" or "tangible medium" should be taken to include a single medium or multiple media (e.g., a centralized or distributed database, and/or associated caches and servers) that stores the one or more sets of instructions. The term "machine-readable medium" shall also be taken to include any medium that is capable of storing, encoding, or carrying a set of instructions for execution by the machine and that causes the machine to perform any one or more of the methodologies of the present method and apparatus, or that is capable of storing, encoding, or carrying data structures utilized by or associated with such a set of instructions. The term "machine-readable medium" shall accordingly be taken to include, but not be limited to, solid-state memories, optical and magnetic media, and carrier wave signals.

It is to be understood that the above description is intended to be illustrative and not restrictive. Although numerous characteristics and advantages of various embodiments as illustrated herein have been set forth in the foregoing description, together with details of the structure and function of various embodiments, many other embodiments and changes to details may be apparent to those of skill in the art upon reviewing the above description. The scope of the system and method should be, therefore, determined with reference to the appended claims, along with the full scope of equivalents to which such claims are entitled. In the appended claims, the terms "including" and "in which" are used as the plain-English equivalents of the respective terms "comprising" and "wherein," respectively. Moreover, the terms "first," "second," and "third," etc., are used merely as labels, and are not intended to impose numerical requirements on their objects.

The Abstract of the Disclosure is provided to comply with 37 C.F.R. §1.72(b), requiring an abstract that may allow the reader to quickly ascertain the nature of the technical disclosure. It is submitted with the understanding that it may not be used to interpret or limit the scope or meaning of the claims. In addition, in the foregoing Description of Example Embodiments, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:
   receiving a query requesting a task to be performed by a first network device, the query generated by the first network device;
   transmitting network health data relating to a second network device separate from the first network device;
   receiving a fix command generated by a network operations center partner based at least in part upon the network health data, the fix command including instructions for the second network device; and
   transmitting to the first network device a task command including the task to be performed by the first network device, the task including the instructions for the second network device, which are to be included in a network device command transmitted from the first network device to the second network device in performance of the task.

2. The method of claim 1, wherein the query is a probe query generated by a probe.

3. The method of claim 1, wherein the first network device is a probe, and the second network device includes at least one of a router, switch, or bridge.

4. The method of claim 1, wherein the network health data includes data relating to a performance metric for the second network device.

5. The method of claim 1 further comprising:
identifying data relating to the second network device;
identifying a best practice standard relating to the second network device, the best practice standard developed by a manufacturer of the second network device; and
determining if the best practice standard is being followed by the second network device based upon an intersection of the best practice standard and the data,
transmitting of the network health data comprising transmitting network health data that includes the best practice standard, wherein the data and the best practices standard do not intersect.

6. The method of claim 5, wherein the network health data includes at least one of security assessment data relating to the second network device, operating system data relating to the second network device, configuration data relating to the second network device, best practices data relating to the second network device, network traffic data encountered by the second network device, memory threshold data for the second network device, service record data for the second network device, performance tuning data relating to the second network device, and operability data for the second network device.

7. The method of claim 5, further comprising transmitting a network health report that includes the network health data.

8. A network device comprising:
one or more processors;
a first receiver to receive a query that requests a task to be performed by a first network device, the query generated by the first network device;
a first transmitter to transmit network health data that relates to a second network device separate from the first network device;
a second receiver to receive a fix command generated by a network operations center partner based at least in part upon the network health data, the fix command including instructions for the second network device; and
a second transmitter to transmit, using the one or more processors, a task command that includes the task to be performed by the first network device, the task including the instructions for the second network device, which are to be included in a network device command to be transmitted from the first network device to the second network device in performance of the task.

9. The network device of claim 8, wherein the query is a probe query generated by a probe.

10. The network device of claim 8, wherein the first network device is a probe, and the second network device includes at least one of a router, a switch, or a bridge.

11. The network device of claim 10, wherein the network health data includes data relating to a performance metric for the second network device.

12. The network device of claim 8 further comprising:
a first identifier engine to identify data relating to the second network device;
a second identifier engine to identify a best practice standard relating to the second network device, the best practice standard developed by a manufacturer of the second network device; and
a best practices and health engine to determine if the best practice standard is being followed by the second network device based upon an intersection of the best practice standard and the data, the second transmitter configured to transmit network health data that includes the best practice standard, wherein the data and the best practices standard do not intersect.

13. The network device of claim 12, wherein the network health data includes at least one of security assessment data relating to the second network device, operating system data relating to the second network device, configuration data relating to the second network device, best practices data relating to the second network device, network traffic data encountered by the second network device, memory threshold data for the second network device, service record data for the second network device, performance tuning data relating to the second network device, and operability data for the second network device.

14. The network device of claim 12, further comprising a third transmitter to transmit a network health report that includes the network health data.

15. An apparatus comprising:
at least one processor;
a memory in communication with the at least one processor, the memory including logic encoded in one or more non-transitory media for execution and when executed operable to:
receive a query requesting a task to be performed by a first network device, the query generated by the first network device;
transmit network health data relating to a second network device separate from the first network device; and
receive a fix command by a network operations center partner based at least in part upon the network health data, the fix command including instructions for the second network device; and
transmit to the first network device a task command including the task to be performed by the first network device, the task including the instructions for the second network device, which are to be included in a network device command transmitted from the first network device to the second network device in performance of the task.

16. Logic encoded in one or more non-transitory media for execution and when executed operable to:
receive a query requesting a task to be performed by a first network device, the query generated by the first network device;
transmit network health data relating to a second network device separate from the first network device; and
receive a fix command by a network operations center partner based at least in part upon the network health data, the fix command including instructions for the second network device; and
transmit to the first network device a task command including the task to be performed by the first network device, the task including the instructions for the second network device, which are to be included in a network device command transmitted from the first network device to the second network device in performance of the task.

17. The network device of claim 8, wherein the first transmitter and the second transmitter are provided by the same device.

18. The network device of claim 8, wherein the first receiver and the second receiver are provided by the same device.

* * * * *

UNITED STATES PATENT AND TRADEMARK OFFICE
CERTIFICATE OF CORRECTION

| | | |
|---|---|---|
| PATENT NO. | : 7,895,320 B1 | |
| APPLICATION NO. | : 12/061233 | |
| DATED | : February 22, 2011 | |
| INVENTOR(S) | : Christopher P. Oggerino et al. | |

It is certified that error appears in the above-identified patent and that said Letters Patent is hereby corrected as shown below:

In column 15, line 53, in Claim 11, delete "claim 10," and insert -- claim 8, --, therefor.

Signed and Sealed this
Nineteenth Day of July, 2011

David J. Kappos
*Director of the United States Patent and Trademark Office*